J. P. KINE.
SICKLE GRINDER.
APPLICATION FILED JULY 5, 1910.
971,449.
Patented Sept. 27, 1910.
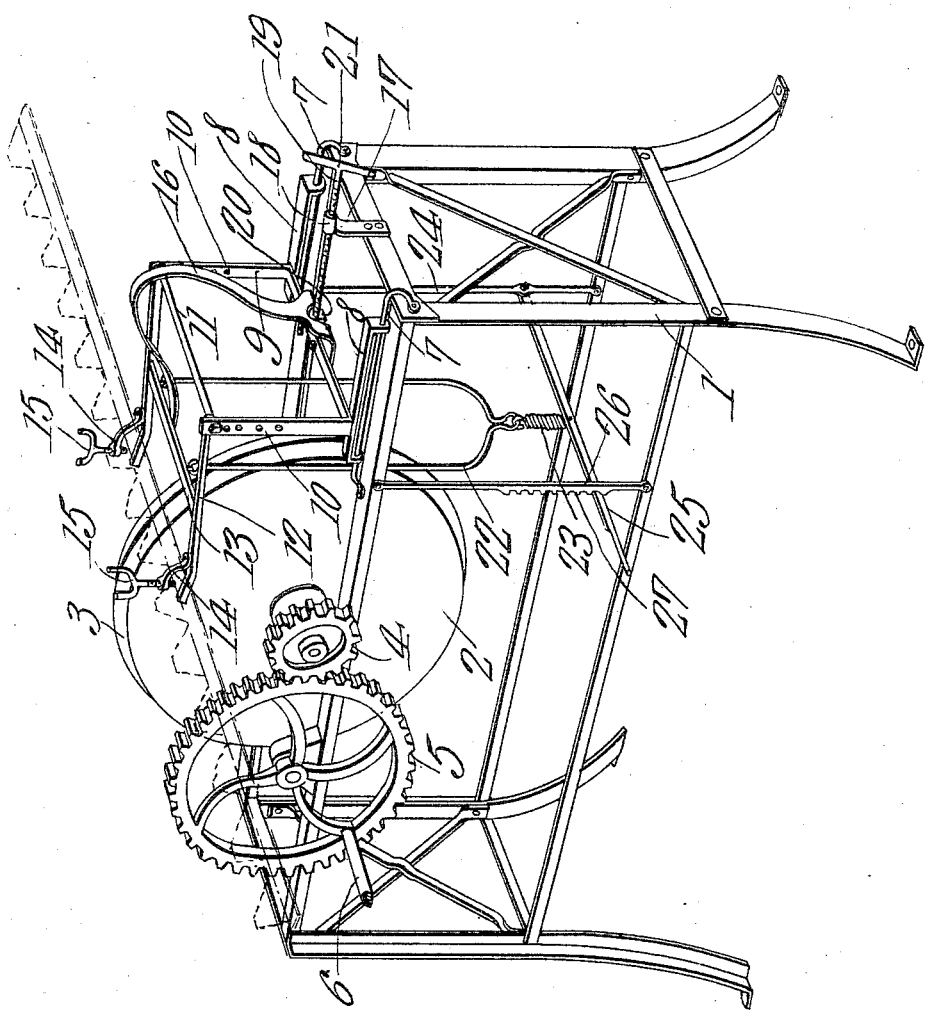
Witnesses
John P. Kine,
Inventor
by C. A. Snow & Co.
Attorneys

UNITED STATES PATENT OFFICE.

JOHN P. KINE, OF WALSENBURG, COLORADO.

SICKLE-GRINDER.

971,449. Specification of Letters Patent. Patented Sept. 27, 1910.

Application filed July 5, 1910. Serial No. 570,412.

*To all whom it may concern:*

Be it known that I, JOHN P. KINE, a citizen of the United States, residing at Walsenburg, in the county of Huerfano and State of Colorado, have invented a new and useful Sickle-Grinder, of which the following is a specification.

This invention has relation to a sickle grinder and consists in the novel construction and arrangement of its part as hereinafter shown and described.

The object of the invention is to provide a device especially adapted to be used for grinding the blades of a sickle bar adapted to be used upon reapers or mowers and with this object in view the device includes a frame upon which an abrading stone is mounted for rotation. Means are provided for rotating the said stone at a relatively fast rate of speed. A holding device is mounted upon the frame and may be manually manipulated to move the sickle bar toward the stone horizontally or to raise and lower the sickle bar with relation to the stone.

In the accompanying drawings the figure is a perspective view of the sickle grinder.

The sickle grinder includes a frame 1, upon which a stone 2 is journaled for rotation. The stone 2 is provided with a convexed periphery 3. A relatively small gear wheel 4 is fixed to the shaft or axle of the stone 2 and meshes with a relatively large gear wheel 5 journaled for rotation upon the frame 1. A handle 6 is attached to the gear wheel 5. Guide rods 7 are mounted upon the upper portion of the frame 1 and are approximately radially disposed with relation to the stone 2. Strips 8 are slidably mounted upon the guide rods 7 and a yoke 9 is fixed in the vicinity of the ends of its intermediate portion to the said strips 8. The end portions of the yoke 9 are upwardly disposed in parallel relation and are provided each with a series of perforations 10. A rod 11 is adapted to be passed through registering perforations 10 at the opposite end portions of the yoke 9. Arms 12 are pivotally mounted on the rod 11 and are connected together by means of a cross bar 13. The arms 12 are disposed toward the stone 2 and are located at the opposite sides thereof. Clips 14 are located upon those ends of the arms 12 adjacent the stone 2 and are provided with clamping screws 15. A spring 16 is attached at one end to the intermediate portion of the yoke 9 and at its intermediate portion passes over the rod 11 and the other end of the said spring 16 bears against the under side of the cross bar 13. The spring 16 is under tension with a tendency to lift the cross bar 13 and the free ends of the arms 12. A standard 17 is mounted upon the upper portion of the frame 1 and is provided at its upper end with an internally threaded approximately horizontal sleeve 18. A bolt 19 is screw threaded in the sleeve 18 and at one end is journaled to a lug 20 fixed to the intermediate portion of the yoke 9. At its other end the bolt 19 is provided with a handle 21. A bail 22 is pivotally connected at its ends to the cross bar 13 at the opposite edges of the spring 16 and a coil spring 23 is connected at one end to the lower intermediate portion of the said yoke 9. A vertically disposed rod 24 is fixed to one side of the frame 1 and a lever 25 is fulcrumed at one end to the said rod 24. The lower end of the coil spring 23 is connected with the intermediate portion of the said lever 25. A vertically disposed rod 26 is attached to the side of the frame 1 opposite the side thereof at which the rod 24 is attached and is provided with a series of teeth 27 which are adapted to be engaged by the free end portion of the lever 25.

In operation a sickle bar is placed between the free ends of the arms 12 and the clips 14 in the manner as indicated in dotted lines in the figure of the drawing and the clamping screws 15 are tightened down against the upper side of the bar. The free end of the lever 25 is then depressed and through the coil spring 23 and the bail 22 the arms 12 are swung down against the tension of the spring 16 until the sickle bar is at the proper elevation. The bolt 19 is then turned so that the yoke 9 and its attachments are advanced toward the stone 2 to the proper extent. Then an operator turns the gear wheel 5 by grasping the handle 6 and inasmuch as the wheel 5 meshes with the wheel 4 the stone 2 is rotated and the adjacent edges of two of the knives of the sickle bar are ground simultaneously. During the grinding operation the free end portion of the lever 25 is engaged with the teeth 27 of the rod 26 and thus the arms 12 are held down in their proper position. The spring 23 affords sufficient resiliency to permit the arms 12 to move in an upward direction should the stone 2 be not exactly concentrically positioned upon its axis or axle. After the adjacent edges of two of the knives have been sufficiently ground the rotation of the stone 2 is interrupted and the free end of the lever 25 is disengaged from the teeth 27 and the said lever together with the spring 23 and the bail 22 and arms 12 are permitted to swing in an upward direction under the tension of the spring 16. Thus the sickle bar is automatically lifted away from the periphery of the stone 2. Therefore it will be seen that a device is provided wherein the cutting edges of the blades of a sickle bar may be ground in a precise and a uniform manner and that the grinding operation may be accomplished in a comparatively short length of time.

Having described my invention what I claim as new and desire to secure by Letters Patent is:—

1. A grinder comprising a frame, an abrading member mounted for rotation thereon, guides mounted upon the frame, a yoke slidably mounted upon the guides, arms pivotally connected to the yoke, clamping devices carried by the arms, means for resiliently holding the arms in an uppermost position, means for moving the yoke along the guides and holding the same in an adjusted position and means for holding the arms in a depressed position against the tension of the said resilient means for holding them in an uppermost position.

2. A grinder comprising a frame, an abrading member journaled upon the frame for rotation, guides located upon the frame, strips slidably mounted upon the guides, a yoke supported upon the strips, arms pivotally connected with the yoke, clamping devices carried by the arms, means for resiliently holding the arms in an uppermost position, means connected with the frame and the yoke for moving the yoke along the guides and holding the same in an adjusted position and means for resiliently holding the arms in a depressed position against the tension of the said means for resiliently holding the arms in an uppermost position.

3. A grinder comprising a frame, an abrading member journaled upon the frame, guides mounted upon the frame, strips slidably mounted upon the guides, a yoke fixed to the strip, arms pivotally connected to the yoke, clamping members carried by the arms, means for resiliently holding the arms in an uppermost position, means for moving the yoke along the guides and holding the same in an adjustable position, a bail connected with the arms, a spring connected with the bail, a lever fulcrumed upon the frame and connected with the said spring and means for holding the said lever in an adjusted position.

In testimony that I claim the foregoing as my own, I have hereto affixed my signature in the presence of two witnesses.

JOHN P. KINE.

Witnesses:
JOHN J. PRITCHARD,
FRED I. WALSEN.